Figure 1:
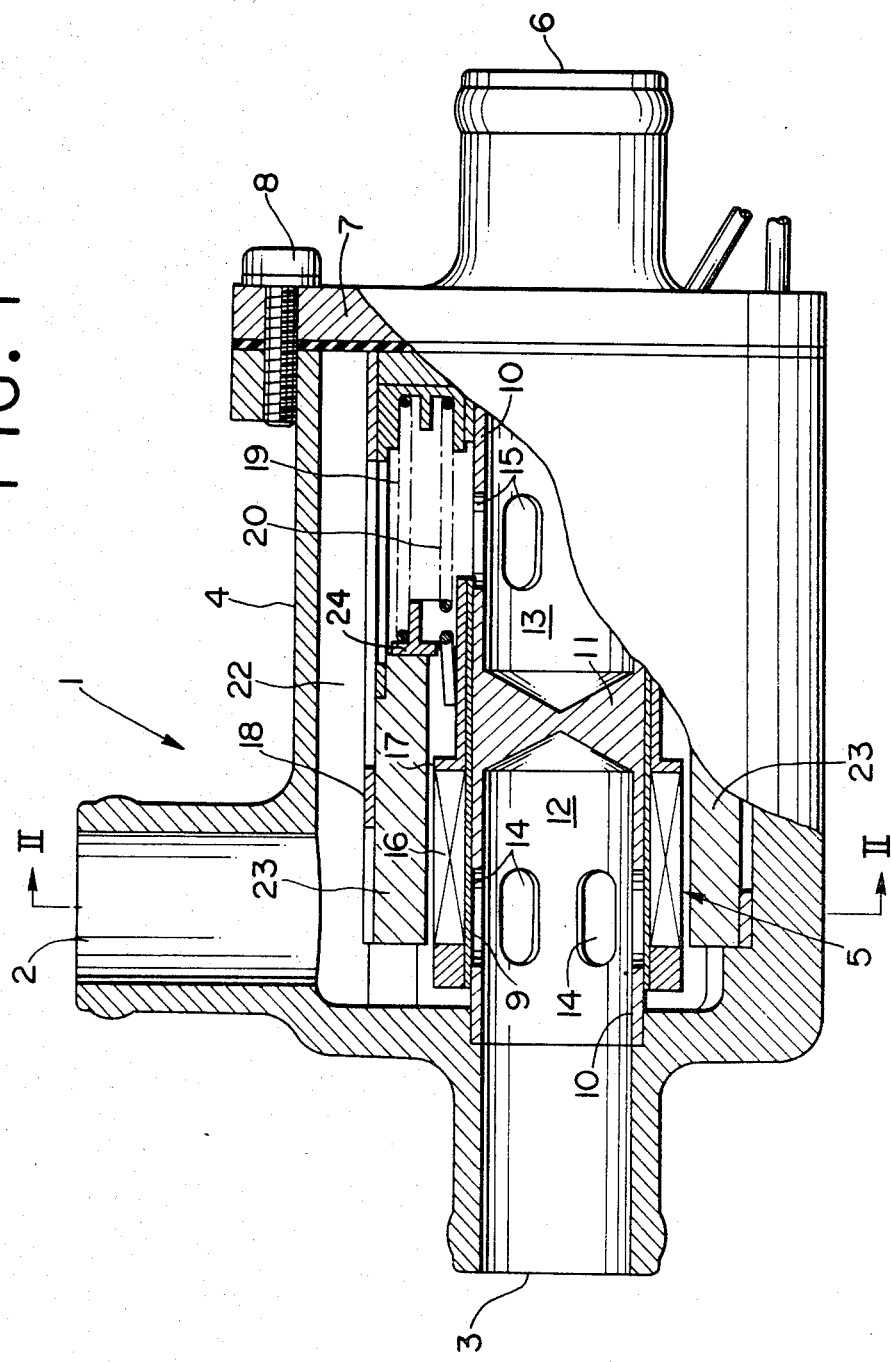

United States Patent [19]

Ohumi et al.

[11] Patent Number: 4,535,815

[45] Date of Patent: Aug. 20, 1985

[54] ELECTROMAGNETIC SOLENOID TYPE FLOW CONTROL VALVE

[75] Inventors: Takeharu Ohumi; Yasuo Kurahashi, both of Toyota; Kyo Hattori; Kazuhiro Sakurai, both of Susono, all of Japan

[73] Assignees: Toyota Jidosha Kabushiki Kaisha, Toyota; Aisin Seiki Kabushiki Kaisha, Kariya, both of Japan

[21] Appl. No.: 608,936

[22] Filed: May 14, 1984

Related U.S. Application Data

[63] Continuation of Ser. No. 156,162, Jun. 3, 1980, abandoned.

[51] Int. Cl.³ .................... F16K 11/07; F16K 31/08
[52] U.S. Cl. .................... 137/625.48; 251/129.15; 251/65; 251/129.21
[58] Field of Search .................... 251/129, 139, 65; 137/625.65, 625.48

[56] References Cited

U.S. PATENT DOCUMENTS

| | | |
|---|---|---|
| 2,637,343 | 5/1953 | Matthews . |
| 3,001,549 | 9/1961 | Nelson et al. . |
| 3,099,280 | 7/1963 | Holzbock . |
| 3,984,745 | 10/1976 | Minalga . |
| 4,216,938 | 8/1980 | Inada et al. ............... 251/139 X |
| 4,286,767 | 9/1981 | Hashimoto ............... 251/139 X |
| 4,294,286 | 10/1981 | Ohumi ............... 137/625.48 |
| 4,307,752 | 12/1981 | Inada et al. ............... 137/625.48 |

*Primary Examiner*—Arnold Rosenthal
*Attorney, Agent, or Firm*—Finnegan, Henderson, Farabow, Garrett & Dunner

[57] ABSTRACT

A solenoid type flow control valve having a valve body formed with an outlet and inlet ports, a cylindrical core disposed in the valve body between the inlet and outlet ports and formed with a suitable number of valve ports for connecting the inlet port with the outlet port, a valve member slidable along the outer surface of the core to cover the valve ports, a linear motor assembly for moving the valve member to uncover the valve ports, and fluid flow passages formed around the linear motor assembly so that the fluid from the inlet port is introduced through the passages into the valve ports.

2 Claims, 2 Drawing Figures

ELECTROMAGNETIC SOLENOID TYPE FLOW CONTROL VALVE

This application is a continuation of application Ser No. 156,162, filed June 3, 1980, and now abandoned.

The present invention relates to an electromagnetic solenoid-type flow control valve, more particularly to a flow control solenoid valve in which fluid flow is controlled in proportion to the energizing current supplied to the valve actuating solenoid.

Known solenoid-type flow control valves include such a type that has a sliding valve member which is adapted to be electromagnetically actuated by means of a linear motor mechanism between closed and open positions. In this type of flow control valve, it is desired that fluid flowing through the valve is substantially proportional to the energizing electric current to the linear motor so that it is conveniently used in various fields such as a catalyst type exhaust gas purifying system in automobile engines. Where this type of solenoid valve is applied to the catalyst type exhaust gas purifying system in automobile engines, the inlet port of the valve is connected to an air supply source such as an air pump and the outlet port is connected to the engine intake passage upstream of the catalytic device so that a desired amount of air is supplied through the solenoid valve to the catalytic device by controlling the electric current to the valve in accordance with the engine temperature, the intake pressure and the engine speed.

In this type of prior art flow control valve, problems have been encountered because the passage for supplying fluid from the inlet port to valve port of the solenoid valve is located in a restricted space between a bobbin and permanent magnet of the linear motor. It is thus difficult for the desired amount of fluid to flow therethrough proportional to the energizing current supplied to the valve actuating solenoid.

In this type of flow control valve, other problems have been encountered in that the sliding valve member or another member associated therewith is subjected to the pressure of the inlet fluid so that when there is any abrupt change in the fluid pressure, the valve member and the associated member may be undesirably displaced under the pressure change. Due to such displacement of the valve member, the fluid flowing through the control valve cannot be proportional to the electric current supplied to the valve. Thus, the valve cannot provide an accurate proportional flow control.

It is therefore an object of the present invention to provide an electromagnetic solenoid type flow control valve which can provide an accurate flow control by using passages located between an inner wall of a valve body and a linear motor.

Another object of the present invention is to provide a flow control solenoid valve which includes passages for providing unrestricted flow and absorbing any change in inlet fluid pressure.

According to the present invention, the above and other objects can be accomplished by an electromagnetic solenoid valve coprising a valve body formed with inlet port means and outlet port means; linear motor means including hollow core means which is disposed in the valve body between the inlet and outlet port means and formed with at least one valve port, sliding valve member means slidable along said hollow core means to cooperate with the valve port in the hollow core means, and solenoid means associated with the sliding valve member means so that the sliding valve member means is slidably moved along the hollow core means when the solenoid means is energized; Passage means are provided in said valve body radially outwardly around said linear motor means to provide an unrestricted fluid communication between said inlet port means and said valve port so that fluid from said inlet port means is introduced through said passage means into said valve port which is controlled by said sliding valve member means. In one mode of the present invention, the hollow core means is comprised of a cylindrical core member and the sliding valve member is in the form of a cylindrical member axially slidably mounted on the core member. The cylindrical member constituting the slidable valve means is attached with a bobbin around which a solenoid coil is wound. Permanent magnets and yoke members of a magnetic material may be provided around the slidable valve means so that a magnetic flux is formed perpendicularly to the convolutions of the solenoid coil.

The passage means is then formed around the permanent magnets and the yoke members. The passage means may be comprised of a single chamber or a plurality of circumferentially spaced chambers communicating with the inlet port means. The valve body may be provided with drain or third port means in addition to the inlet and outlet port means, and the interior of the cylindrical core member may communicate at opposite ends with the outlet and drain port means, respectively. Then, the core member may be provided at the intermediate portion with a partition wall to separate one end from the other end. An axial movement of the slidable valve member then regulates the communication between the inlet port means and the outlet and drain port means. The valve member means may be resiliently biased by spring means toward the closed position wherein the communication between the inlet and outlet port means is interrupted, and the solenoid coil may then function when energized to move the valve member means toward the open position.

Figure 2:
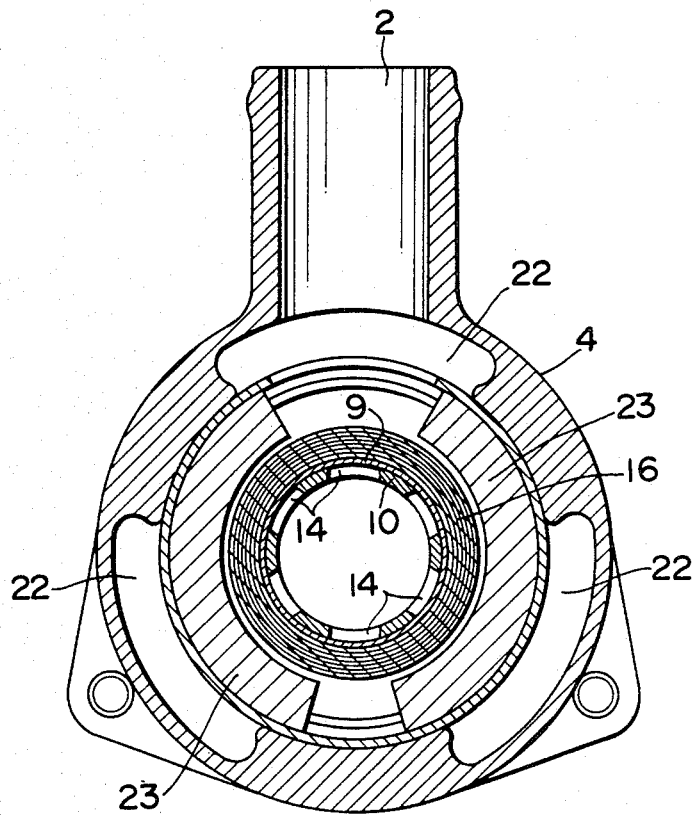

The above and other objects and features of the present invention will become apparent from the following description of a preferred embodiment with reference to the accompanying drawings, in which:

FIG. 1 is a partially sectional side view of an electromagnetic solenoid valve in accordance with one embodiment of the present invention; and, FIG. 2 is a sectional view taken substantially along line II—II in FIG. 1.

Referring now to the drawings, there is shown an electromagnetic solenoid-type flow control valve 1 which includes a valve body 4 provided with an inlet port 2 and an outlet port 3. Within the valve body 4, there is disposed a linear motor assembly 5. The valve body 4 is open at the outlet port 3 end and the open end is covered by an end plate 7. The end plate 7 has a third or drain port 6 and is attached to the valve body 4 by means of bolts 8.

In the valve body 4, there is disposed a cylindrical core member 10 which extends between the ports 3 and 6. The core member 10 is formed at the intermediate portion with a partition wall 11 to define therein a first chamber 12 and a second chamber 13 which respectively communicate with the ports 3 and 6. The core member 10 has a plurality of valve ports 14 formed in the wall defining the first chamber 12 and further in the wall defining the second chamber 13, there is formed a plurality of valve ports 15. Around the cylindrical core member 10, there is mounted a cylindrical sliding valve member 9 which is axially slidable along the core member 10. The valve member 9 is attached to a bobbin 17 around which a solenoid coil 16 is wound. Outside the bobbin 17 and the solenoid coil 16, there are provided a pair of permanent magnets 23 and a pair of yoke members 18 for providing magnetic flux in the direction perpendicular to the convolutions of the solenoid coil 16. The bobbin 17 is resiliently biased by means of springs 19 and 20 toward left in FIG. 1 so that the valve ports 14 are normally covered by the valve member 9. When the solenoid coil 16 is energized, the bobbin 17 and the valve member 9 are displaced against the influence of the springs 19 and 20 to open the valve ports 14 and to cover the valve ports 15.

Between the inner wall of the valve body 4 and the linear motor assembly 5, there are formed three passages 22 which extend along the length of the valve body 4 as shown in FIG. 1 and are circumferentially spaced from each other as shown in FIG. 2. The passages 22 are in communication, on one hand, with the inlet port 2 and on the other hand, with the valve ports 14 and 15 so that the fluid from the inlet port 2 is introduced into the passages 22 before it reaches the valve ports 14 and 15. In the illustrated embodiment, three circumferentially spaced passages 22 are provided. It should be noted, however, that the number of chambers 22 may be changed as desired and even a single passage may sometimes be sufficient.

According to the structure described above, there are passages 22 between the inlet port 2 and the linear motor assembly 5 so that fluid flow is no longer restricted, and any change in fluid pressure at the inlet port is absorbed by the passages 22. Thus, the end surfaces 24 of the bobbin 17 and the valve member 9 are not directly subjected to such fluid pressure change. It is therefore possible to prevent the sliding valve 9 from being undesirably displaced under a change in the inlet fluid pressure possibly causing an error in the control of the fluid flow.

The invention has thus been shown and described with reference to a specific embodiment. However, it should be noted that the invention is in no way limited to the details of the illustrated structures, but changes and modifications may be made without departing from the appended claims.

We claim:
1. An electromagnetic solenoid valve comprising:
a valve body having inlet port means and outlet port means;
linear motor means including hollow core means disposed in said valve body between said inlet and outlet port means and having a plurality of valve ports, sliding valve member means slidable along said hollow core means for cooperating with said valve ports in said hollow core means, including spring means and flange means for supporting said spring means, and solenoid means associated with said sliding valve member means for slidably moving the sliding valve member means along the hollow core member against the bias of said spring means when the solenoid means is energized;
said linear motor means including a yoke member fixed within said valve body, and a pair of magnets fixed to said yoke member at spaced apart locations, each said magnet including an outer surface, an inner surface, and a pair of ends, said flange means including surfaces abutting each said magnet on one end thereof for avoiding exposure of said abutting surfaces of said flange means to dynamic pressure from said flowing fluid when said solenoid means is in a de-energized state;
bypass passage means in said valve body extending radially outwardly around said linear motor means, and linearly parallel to said hollow core means, said linear motor means including openings into said bypass passage means for establishing direct radial fluid communication between said bypass passage means and said valve ports around said magnets for introducing fluid from said inlet port means through said passage means into said valve ports, said valve ports being controlled by said sliding valve member means
said outlet port means comprising two outlet ports communicating with said inlet port means through said bypass passage means and the valve ports in said hollow core means, said valve ports being linearly spaced away from each other along said core means for substantial alignment with respective outlet ports.

2. An electromagnetic solenoid valve comprising:
a valve body having inlet port means and outlet port means;
linear motor means including hollow core means disposed in said valve body between said inlet and outlet port means and having a plurality of valve ports, sliding valve member means slidable along said hollow core means for cooperating with said valve ports in said hollow core means, including spring means for biasing said slidable valve member means and flange means for supporting said spring means, and solenoid means associated with said sliding valve member means for slidably moving the sliding valve member means along the hollow core means against the bias of said spring means when the solenoid means is energized;
said linear motor means including a yoke member fixed within said valve body, and a pair of magnets fixed to said yoke member at spaced apart locations, each said magnet including an outer surface, an inner surface, and a pair of ends, said flange means including surfaces abutting each said magnet on one end thereof for avoiding exposure of said abutting surfaces of said flange means to dynamic pressure from said flowing fluid when said solenoid means is in a de-energized state;
bypass passage means in said valve body extending radially outwardly around said linear motor means, and linearly parallel to said hollow core means, said linear motor means including openings into said bypass passage means for establishing direct radial fluid communication between said bypass passage means and said valve ports around said magnets for introducing fluid from said inlet port means through said passage means into said valve ports, said valve ports being controlled by said sliding valve member means;
said hollow core means comprising a substantially cylindrical core member having one end in communication with said outlet port means, said cylindrical core member having valve port means in the cylindrical wall thereof, said inlet port means being outside said core member, said sliding valve member having a cylindrical configuration, and being mounted on said core member for slidable movement along the outer surface thereof for closing said valve port means;

said valve body having a side opposite to said outlet port means including third port means in communications with the other end of said cylindrical core member, said cylindrical core member having partition wall means at an intermediate portion thereof for defining therein first and second chambers, said chambers respectively communicating with said one and said other ends, said valve port means being formed in said first chamber, and second valve port means being formed in said second chamber, said sliding valve member means being movable between a first position wherein said sliding valve member means closes said valve port means and opens said second valve port means and a second position wherein said sliding valve member means opens said valve port means and closes said second valve port means.

* * * * *